Figure 1:
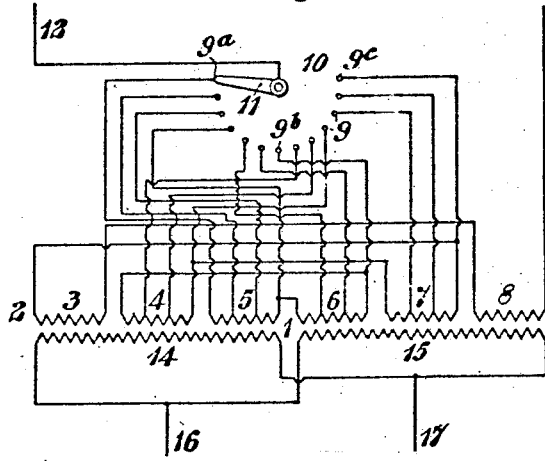

No. 740,174. PATENTED SEPT. 29, 1903.
J. S. PECK.
MEANS FOR VARYING THE VOLTAGE RATIO OF TRANSFORMERS.
APPLICATION FILED FEB. 28, 1903.
NO MODEL.

WITNESSES:
C. L. Belcher
Birney Hines

INVENTOR
John S. Peck
BY
Keeley L. Carr
ATTORNEY.

No. 740,174.                                                                                         Patented September 29, 1903.

UNITED STATES PATENT OFFICE.

JOHN S. PECK, OF PITTSBURG, PENNSYLVANIA, ASSIGNOR TO WESTINGHOUSE ELECTRIC & MANUFACTURING COMPANY, A CORPORATION OF PENNSYLVANIA.

MEANS FOR VARYING THE VOLTAGE RATIO OF TRANSFORMERS.

SPECIFICATION forming part of Letters Patent No. 740,174, dated September 29, 1903.

Application filed February 28, 1903. Serial No. 145,619. (No model.)

*To all whom it may concern:*

Be it known that I, JOHN S. PECK, a citizen of the United States, residing in Pittsburg, in the county of Allegheny and State of Pennsylvania, have invented a new and useful Improvement in Means for Varying the Voltage Ratio of Transformers, of which the following is a specification.

My invention relates to transformers, and specially to means for varying the voltage ratio of transformers.

The object of my invention is to provide a simple and efficient means whereby the active length of either the primary or the secondary winding of a transformer may be varied to suit the ratio of transformation without materially altering the balanced condition of the several parts of the windings, which obtains when the entire lengths of both windings are in circuit.

It is frequently desired to change the voltage ratio of a transformer by changing the number of turns in the one or the other of its windings. This is ordinarily accomplished by providing taps or leads from different points in one of the windings and transferring one line-terminal from one tap or lead to another by means of a suitable regulator or switching device.

Nearly all transformers of any considerable size are provided with several primary and several secondary coils, which are so interlaced in the transformer that the magnetic leakage is a minimum, and if the coils of either winding are to be connected in parallel it is necessary that each of the coils shall occupy a symmetrical magnetic position with reference to the coils of the opposite winding, for the reason that if the positions are unsymmetrical the voltages induced in the different coils will be different and when connected in parallel there will be an interchange of current between the coils, which will be productive of heat to an objectionable degree. It follows, therefore, that with the usual arrangement above mentioned the cutting out of some of the turns of the primary winding, for example, will leave the secondary coils unsymmetrically located with reference to the active primary winding, and when so located they cannot be connected in parallel with each other without an interchange of current, which causes heat.

I have shown in the accompanying drawings means for avoiding the difficulties hereinbefore pointed out, in which—

Figure 2:
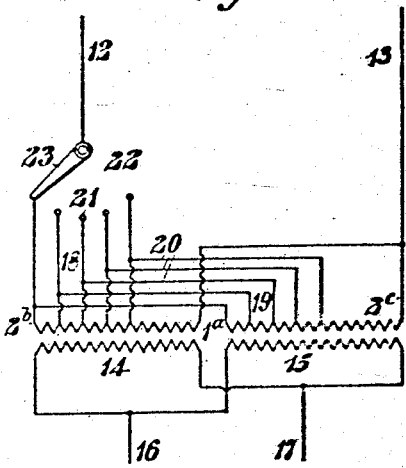
Figure 3:
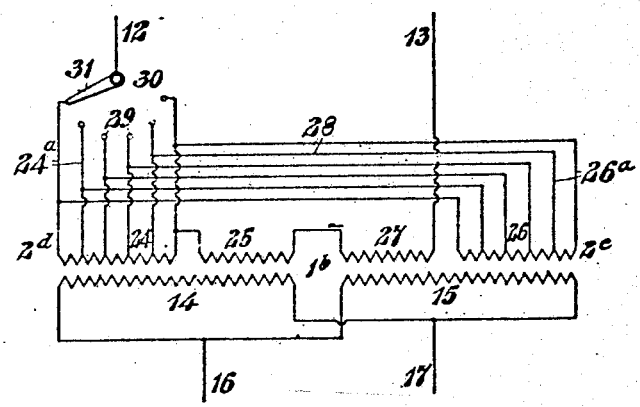
Figure 4:
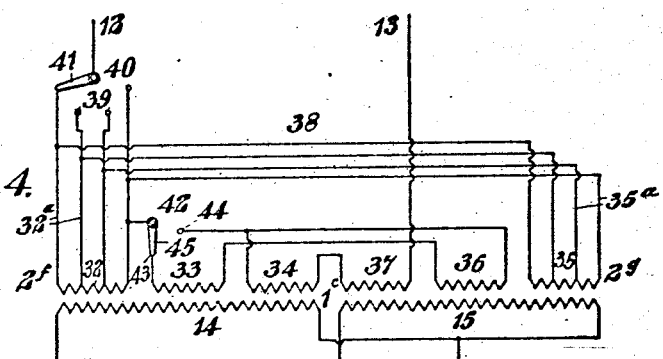

Figure 1 is a diagram of a transformer and regulator constructed and arranged in accordance with my invention, and Figs. 2, 3, and 4 are similar views of modifications.

In Fig. 1 I have shown a transformer 1, having two primary coils 2 and $2^a$, which are respectively divided into three parts 3, 4, and 5 and 6, 7, and 8, the parts 4, 5, 6, and 7 being provided with intermediate taps or leads, which are connected to the respective stationary contact-terminals 9 of a regulating-switch 10, the movable member 11 of which is connected to the line conductor 12 of the supply-circuit. The other line conductor 13 is connected directly to the outer terminal of the length 8 of the primary winding of the transformer, and the several lengths are connected together as follows: the inner terminals of lengths 3 and 8, the outer terminals of lengths 3 and 7, the inner terminals of lengths 4 and 7, and the outer terminals of lengths 4 and 6, and the inner terminals of lengths 5 and 6. It will be seen that with this arrangement of leads and interconnections the active portion of the primary winding will be symmetrically disposed with reference to the secondary winding, here shown as comprising two portions 14 and 15, connected in parallel to the line conductors 16 and 17 when the switch-arm 11 is in engagement with any one of the three terminals $9^a$, $9^b$, and $9^c$. When the member 11 is in any of its other operative positions, there will be an unbalanced condition to a limited degree; but this is small and may be reduced still further by increasing the number of sections into which each coil is divided. As here shown, the active turns of the primary winding are all connected in series, as will be readily seen without specifically enumerating the conductors which are in the circuit corresponding to each position of the regulating-switch.

In the modification shown in Fig. 2 the two secondary coils 14 and 15 of the transformer 1ᵃ are connected in parallel to the distributing-circuit 16 17, the same as in Fig. 1. The two primary coils 2ᵇ and 2ᶜ are also connected in parallel to the supply-mains 12 and 13 and are respectively provided through at least a portion of their lengths with spaced leads 18 and 19, the corresponding leads being cross-connected by conductors 20. The cross-connected leads are connected to the stationary contact-terminals 21 of a regulating-switch 22, the movable member 23 being adjustable, so as to vary the active length of the primary winding, and thus vary the voltage ratio of the transformer. It will be readily seen that by reason of the symmetrical arrangement of the leads and the cross connections the disposition of the active length of the primary winding with reference to the secondary winding is always symmetrical, whatever may be the position of the regulating-switch. This method is practicable and desirable in transformers having but two primary coils; but if the number of coils were greater than two their parallel connection to the supply-circuit might be impracticable by reason of the fact that each coil would have to be wound for the full voltage of the primary circuit.

In Fig. 3 I have shown a transformer in which the results as regards desired regulation of voltage ratio may be readily secured, whatever may be the number of primary coils. In this case the secondary coils 14 and 15 of the transformer 1ᵇ are connected in parallel to the distributing-circuit 16 17, the same as in the preceding figures, and the primary coils 2ᵈ and 2ᵉ are respectively divided into two parts 24 25 and 26 27. The part 24 of the coil 2ᵈ is provided with a plurality of spaced leads 24ᵃ, and the corresponding part 26 of the coil 2ᵉ is provided in the same manner with a plurality of spaced leads 26ᵃ. The corresponding leads of the two sets are cross-connected by means of conductors 28, and these cross-connected leads are connected to the stationary contact-terminals 29 of a regulating-switch 30, the movable member 31 of which is operated to vary the amount of active winding in the primary circuit of the transformer in a manner which will be readily understood. The portions 24 and 26 of the two coils 2ᵈ and 2ᵉ are connected in parallel with each other or corresponding portions of these sections are so connected, depending of course upon the position of the regulating-switch 30. The portions 25 and 27 of the two coils are connected in series with each other and are also in series with the active portions of the two sections 24 and 26. As an illustration of a result which may be secured with this combination and arrangement it may be assumed that two hundred electrical turns are required in the primary winding and that it is desired to cut out a total of one hundred turns in order to secure the maximum range of voltage variation in the secondary. Such being the case, the sections 24 and 26 may each have one hundred turns and the sections 25 and 27 each have fifty turns, and since the two sections 25 and 27 are connected in series with each other and also in series with the sections 24 and 26 and the latter are connected in parallel the total when the regulating-switch is in the position indicated in the drawing will equal two hundred turns, and it is also obvious that in this method of connection the symmetrical relation of the primary coils to the secondary coils is maintained for all positions of the regulating-switch.

Referring now to Fig. 4, the secondary coils 14 and 15 of the transformer 1ᶜ are connected in parallel to the distributing-circuit 16 17, as in the preceding figure; but the primary coils 2ᶠ and 2ᵍ are respectively divided into three parts 32, 33, and 34 and 35, 36, and 37, the parts 32 and 35 being respectively provided with spaced leads 32ᵃ and 35ᵃ, which are cross-connected by means of conductors 38 to the stationary contact-terminals 39 of a regulating-switch 40, the movable member 41 of which serves to vary the active length of the primary winding in substantially the manner heretofore described in connection with what is shown in the preceding figures. In this modification the outer terminal of the portion 37 of the primary winding is connected directly to the conductor 13 of the supply-mains. The inner terminals of the parts 34 and 37 are connected together, as are also the outer terminals of the parts 34 and 36. The inner terminals of the parts 33 and 36 are also connected together and a supplemental switch 42 is provided, one stationary contact-terminal 43 of which is connected to the outer terminal of the part 33, and the other stationary contact-terminal 44 of which is connected to the outer terminals of the parts 34 and 36, the movable member or switch-arm 45 being connected to the inner terminal of the part 32. When the switch-arm 45 is in engagement with the contact-terminal 43, as indicated in the drawings, the portions 33, 34, 36, and 37 will be connected in circuit and in series with each other, and either all or a part of the sections 32 and 35 will be also connected in parallel with each other and in series with the parts 33, 34, 36, and 37, according to the position of the member 41 of the switch 40. When the switch-arm 45 is in engagement with the contact-terminal 44, the sections 33 and 36 will be out of circuit and the sections 34 and 37 will be in series with each other and also in series with such portions of the sections 32 and 35 as may be connected in parallel circuit with each other by the switch 40. Whatever may be the position of the switch 42, the active length of the primary winding will obviously be symmetrically disposed with reference to the secondary winding of the transformer, and consequently the desired result will be secured.

While I have indicated the regulating means as applied to the primary winding of a transformer in each of the modifications illustrated and described, it is to be understood that the desired result may be secured by applying the regulating means to either the primary or the secondary winding. I have also shown each transformer as having only two primary and two secondary coils; but this illustration has been adopted merely to avoid complication and to simplify the illustration and description so far as may be possible, it being understood that ordinarily a considerable number of both primary and secondary coils is employed and that the invention is intended to be utilized in connection with any number of such coils.

The illustration of the invention as applied to single-phase transformers is also not restrictive, since it is equally applicable to polyphase transformers, and the invention is to be construed as having sufficient scope to include transformers adapted to any number of phases which it may be desired to employ in practice.

Variations in the arrangement of the spaced leads and the regulating-switches with reference to each other and also with reference to the sections and circuit connections of the transformer-coils may be made which are not here specifically illustrated and which may be found useful in practice. I therefore desire it to be understood that any and all such variations which do not materially modify the mode of operation or result are included within the scope of my invention.

I claim as my invention—

1. A transformer having a plurality of corresponding portions of one of its windings provided with interconnected leads, in combination with a switch connected to said leads for symmetrically varying the voltage ratio of the transformer.

2. A transformer-winding comprising a plurality of coils each of which has a plurality of spaced leads, connections between corresponding leads of different coils and a switch for connecting any set of connected leads to a line conductor.

3. A transformer having a winding comprising a plurality of coils each of which has a plurality of spaced leads, connections between corresponding leads of different coils, means for connecting any set of connected leads to a line conductor and a winding comprising a plurality of coils connected in parallel to its line conductors.

4. In a transformer, a winding comprising a plurality of coils a portion of each of which is provided with spaced leads, connections between corresponding leads of different coils and means for connecting any set of connected leads to a line conductor in accordance with the voltage ratio desired.

5. A transformer having a winding comprising a plurality of coils each of which has a plurality of spaced leads, corresponding leads in the different coils being connected permanently in parallel, in combination with a regulating-switch having stationary contact-terminals to which said leads are connected.

In testimony whereof I have hereunto subscribed my name this 24th day of February, 1903.

JOHN S. PECK.

Witnesses:
T. N. HICKS,
JAMES B. YOUNG.